(12) United States Patent
Okubo et al.

(10) Patent No.: US 7,200,249 B2
(45) Date of Patent: Apr. 3, 2007

(54) ROBOT DEVICE AND FACE IDENTIFYING METHOD, AND IMAGE IDENTIFYING DEVICE AND IMAGE IDENTIFYING METHOD

(75) Inventors: Atsushi Okubo, Tokyo (JP); Kohtaro Sabe, Tokyo (JP); Kenta Kawamoto, Tokyo (JP); Masaki Fukuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 714 days.

(21) Appl. No.: 10/181,279

(22) PCT Filed: Nov. 19, 2001

(86) PCT No.: PCT/JP01/10101

§ 371 (c)(1),
(2), (4) Date: Oct. 24, 2002

(87) PCT Pub. No.: WO02/41254

PCT Pub. Date: May 23, 2002

(65) Prior Publication Data

US 2003/0059092 A1    Mar. 27, 2003

(30) Foreign Application Priority Data

Nov. 17, 2000    (JP) .............................. 2000-351897

(51) Int. Cl.
*G06K 9/00*    (2006.01)

(52) U.S. Cl. ..................... 382/118; 382/115; 348/169

(58) Field of Classification Search ................ 382/103, 382/115, 118, 119, 156, 157, 158, 159; 700/115; 348/169, 170, 171, 172, 208.14, 526, 579, 348/587, 604, 700, 703; 725/19
See application file for complete search history.

(56) References Cited

U.S. PATENT DOCUMENTS

| | | | | |
|---|---|---|---|---|
| 5,164,992 A | * | 11/1992 | Turk et al. .................. | 382/118 |
| 5,323,470 A | * | 6/1994 | Kara et al. .................. | 382/103 |
| 5,870,138 A | * | 2/1999 | Smith et al. ................ | 348/143 |
| 6,088,469 A | * | 7/2000 | Fukumura et al. .......... | 382/103 |
| 6,188,777 B1 | * | 2/2001 | Darrell et al. .............. | 382/103 |

(Continued)

FOREIGN PATENT DOCUMENTS

EP    0 867 831    9/1998

(Continued)

*Primary Examiner*—Jingge Wu
*Assistant Examiner*—Abolfazi Tabatabai
(74) *Attorney, Agent, or Firm*—Frommer Lawrence & Haug LLP; William S. Frommer; Thomas F. Presson

(57) ABSTRACT

A robot apparatus includes face includes a face tracking module (M2) for tracking a face in an image photographed by a CCD camera, a face detecting module (M1) for detecting face data of the face in the image photographed by the image pickup device, based on the face tracking information by the face tracking module (M2) and a face identification module (M3) for identifying a specified face based on the face data as detected by the face data detecting module (M1).

16 Claims, 12 Drawing Sheets

U.S. PATENT DOCUMENTS

| | | | |
|---|---|---|---|
| 6,611,613 B1* | 8/2003 | Kang et al. | 382/118 |
| 6,708,081 B2* | 3/2004 | Yoshida | 700/245 |
| 6,804,391 B1* | 10/2004 | Blake et al. | 382/159 |
| 6,940,545 B1* | 9/2005 | Ray et al. | 348/222.1 |
| 6,944,319 B1* | 9/2005 | Huang et al. | 382/118 |
| 6,990,217 B1* | 1/2006 | Moghaddam et al. | 382/118 |

FOREIGN PATENT DOCUMENTS

| | | |
|---|---|---|
| JP | 10-293850 | 11/1998 |
| JP | 11-15979 | 1/1999 |
| JP | 2000-210886 | 8/2000 |
| WO | WO 00/43168 | 7/2000 |

* cited by examiner

| | INPUT EVENT NAME | DATA NAME | DATA RANGE | PROBABILITY OF TRANSITION TO OTHER NODES Di | | | | | |
|---|---|---|---|---|---|---|---|---|---|
| node 100 | | | | A | B | C | D | ... | n |
| NODE OF DESTINATION OF TRANSITION | | | | node 120 | node 120 | node 1000 | | | node 600 |
| OUTPUT BEHAVIOR | | | | ACTION 1 | ACTION 2 | MOVE BACK | | | ACTION 4 |
| 1 | BALL | SIZE | 0.1000 | 30% | | | | | |
| 2 | PAT | | | | 40% | | | | |
| 3 | HIT | | | | 20% | | | | |
| 4 | MOTION | | | | | | | | |
| 5 | OBSTACLE | DISTANCE | 0.100 | | | | | | |
| 6 | | JOY | 50.100 | | | 50% | | | |
| 7 | | SUPRISE | 50.100 | | | 100% | | | |
| 8 | | SADNESS | 50.100 | | | | | | |

ROBOT DEVICE AND FACE IDENTIFYING METHOD, AND IMAGE IDENTIFYING DEVICE AND IMAGE IDENTIFYING METHOD

TECHNICAL FIELD

This invention relates to a robot apparatus, a face identification method, and image discriminating methods and apparatus. More particularly, it relates to a robot apparatus that behaves autonomously and is able to discriminate faces, a method for discriminating the faces applicable to such robot apparatus, and to methods and apparatus for discriminating images.

BACKGROUND ART

In verifying the theory of pattern recognition, benchmark like importance has been attached to researches in face recognition, such that many techniques have so far been developed. The application, presupposed in these researches, is mostly in need of high degree of accuracy under static environment, such as authorization in a security system and retrieval of individuals from a large-scale database.

Recently, a robot apparatus for entertainment, formed to an outer shape like that of an animal, such as a dog, has been presented to the market. This robot apparatus is responsive to the information from outside, such as information of the surrounding environment, or to the internal state, such as the feeling state, to cause autonomous action of eyes or limbs, to manifest the behavior like that of an animal.

As this robot apparatus has made its debut, there has been developed a human interfacing technique for causing the robot apparatus to respond within a preset time more or less accurately even under an environment which is changed dynamically. As typical of this technique, face identification by the robot apparatus has been a desideratum. For example, if face identification is used, the robot apparatus is able to identify the user (keeper) from many to enhance its entertainment properties.

In an application for face identification, loaded on the robot apparatus, the following problems:

(1) that, since the robot apparatus itself is moved, changes in the environment or its diversity must be tolerated;
(2) since the position relationships between the human being and the robot apparatus are changed, the human being must be in the field of view of the robot apparatus during interactions;
(3) an image usable for discriminating the human being must be selected from numerous scenes and verified comprehensively; and
(4) that reply must be made in certain preset time.

DISCLOSURE OF THE INVENTION

It is therefore an object of the present invention to provide a robot apparatus, a face identification method, and image discriminating methods and apparatus, which are capable of solving the aforementioned problems without detracting from autonomous properties of the robot apparatus itself.

For accomplishing the above object, a robot apparatus according to the present invention includes an autonomously acting robot apparatus including image pickup means, face data tracking means for tracking a face changing in an image photographed by the image pickup means, face data detecting means for detecting face data of the face in the image photographed by the image pickup means, based on the face tracking information by the face tracking information, and face identification means for discriminating a specified face based on the face data as detected by the face data detection means.

This robot apparatus detects face data of a face as it tracks the face changed in an image and specifies the specified face based on the detected face data.

For accomplishing the above object, a method for discriminating a face according to the present invention includes an image pickup step of photographing an image by image pickup means, a face tracking step of tracking a face moved in an image photographed at the image pickup step, a face data detection step of detecting face data of the face in the image photographed at the image pickup step based on the face tracking information obtained at the face tracking step, and a person discriminating step of discriminating a specified person based on the face data detected at the face data detection step.

This face discriminating method detects face data of a face as it tracks the face changed in an image and specifies the specified face based on the detected face data.

For accomplishing the above object, image discriminating apparatus includes registered face image storage means having a face image stored therein, image inputting means for being fed with a preset image from outside, face picture tracking means for tracking a face image fed from the image inputting means based on the color information, face detection means for detecting a face using a support vector machine for an estimated face position of the input face image calculated from tracked results by the face image tacking means and person identification means for discriminating a person by comparing a face detected by the face detection means with a face image stored in the registered face image storage means.

This image discriminating apparatus detects face data as it tracks a face image fed from outside based on the color information and compares the so detected face data to a face image stored in registered face image storage means to effectuate person identification.

For accomplishing the above object, an image discriminating method according to the present invention includes an image inputting step of being fed with a preset image from outside, a face image tracking step of tracking a face image fed at the image inputting step based on the color information, a face detection step of detecting a face using a support vector machine for an estimated face position of the input face image calculated from the result of tracking at the face image tracking step and a person identifying step of identifying a person by comparing a face detected at the face detection step with a face image stored in the registered face image storage step in which the face image is stored.

This image discriminating method detects face data as it tracks a face image fed from outside based on the color information and compares the so detected face data to a face image stored in registered face image storage means to effectuate person identification.

Other objects, features and advantages of the present invention will become more apparent from reading the embodiments of the present invention as shown in the drawings.

BRIEF DESCRIPTION OF THE DRAWINGS

FIG. 8 shows a status transition table provided for each node of the finite probability automaton.

BEST MODE FOR CARRYING OUT THE INVENTION

Figure 1:
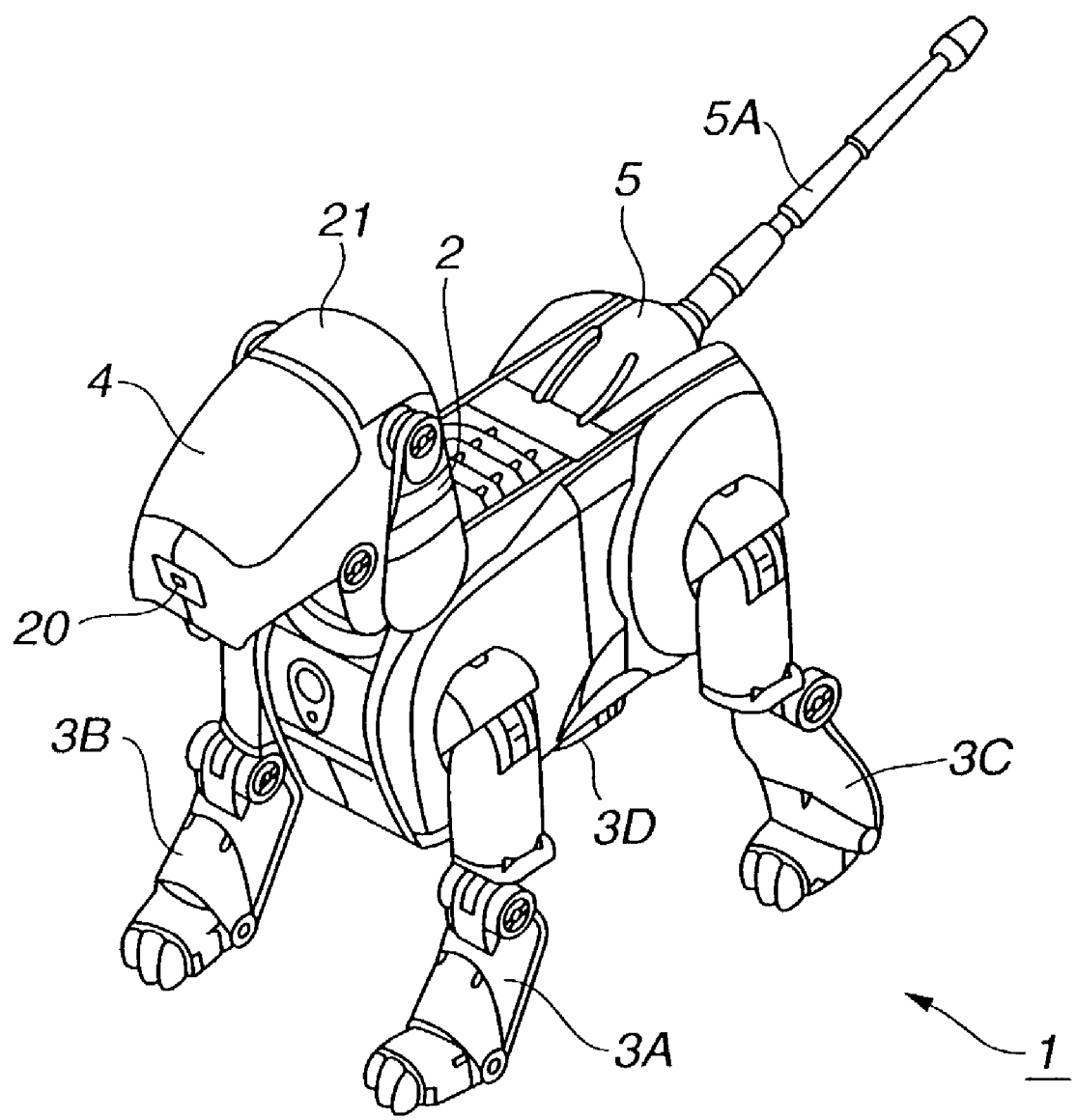
FIG. 1 is a perspective view showing the appearance of a robot apparatus embodying the present invention.

Referring to the drawings, a preferred embodiment of the present invention is explained in detail. This embodiment is of the present invention applied to a robot apparatus formed to an outer shape like that of an animal, such as a dog. This robot apparatus is responsive to the information from outside, such as information of the surrounding environment, or to the internal state, such as the feeling state, to cause autonomous action of eyes or limbs, to manifest the behavior like that of an animal. Also, the robot apparatus is structured to be able to identify the user (keeper) from many.

In the present embodiment, the structure of the robot apparatus is first explained and subsequently face identification applying the present invention in the robot apparatus is explained in detail.

(1) Structure of Robot Apparatus of the Present Embodiment

As shown in FIG. 1, the robot apparatus is a so-called pet robot, simulating an animal, such as a 'dog', and is constructed by leg units 3A, 3B, 3C and 3D, connected on the front and rear sides on the left and right sides of a trunk unit 2, and by a head unit 4 and a tail unit 5, connected to the front and rear ends of the trunk unit 2, respectively.

Figure 2:
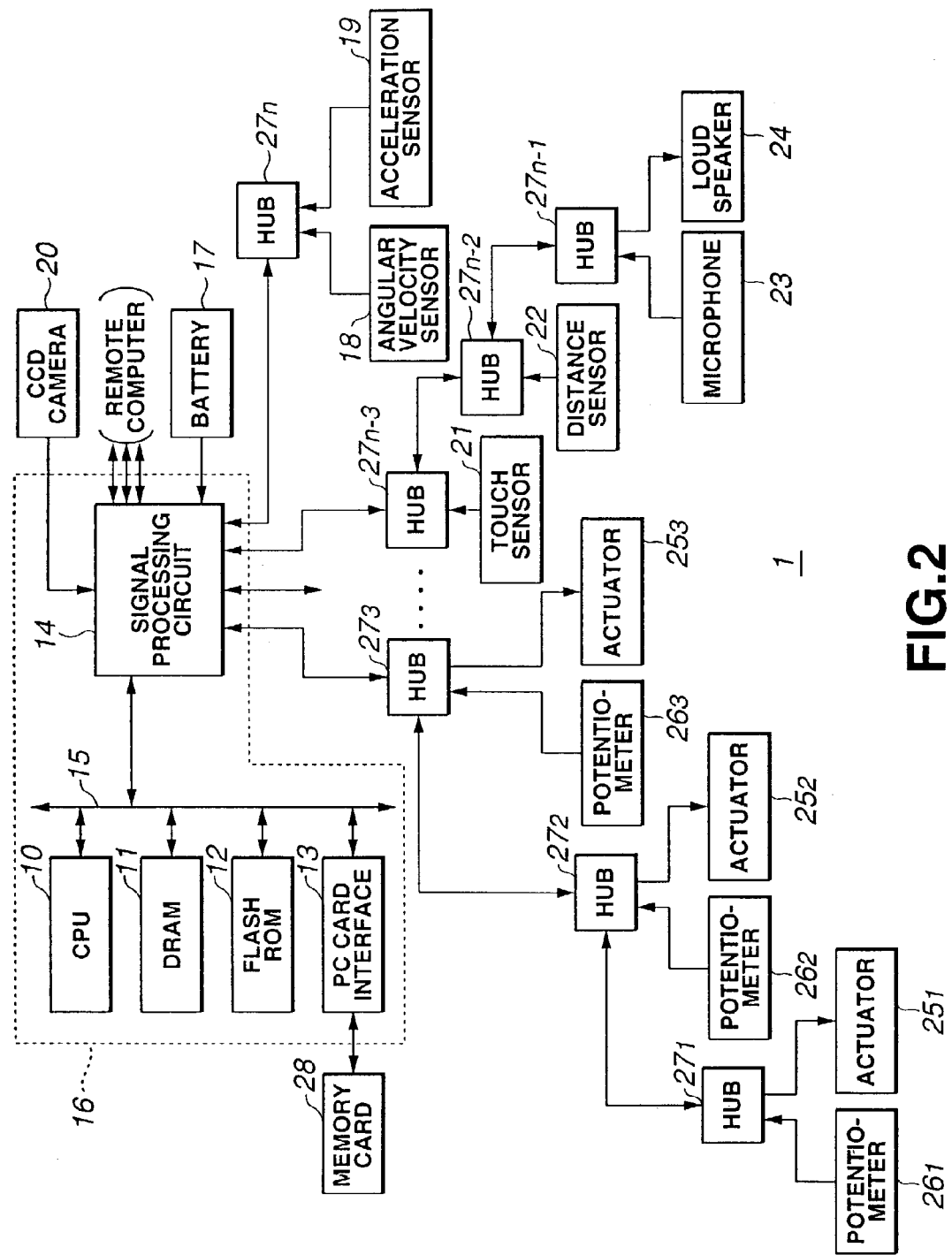
FIG. 2 is a block diagram showing a circuit structure of the robot apparatus.

Referring to FIG. 2, the trunk unit 2 includes a controller unit 16, comprised of an interconnection over an internal bus 15 of a CPU (central processing unit) 10, a DRAM (dynamic random access memory) 11, a flash ROM (read-only memory) 12, a PC (personal computer) card interface circuit 13 and a signal processing circuit 14, and a battery 17 as a power supply for the robot apparatus 1. In the trunk unit 2 are also housed an angular velocity sensor 18 and an acceleration sensor 19 for detecting the posture and the acceleration of movement of the robot apparatus 1.

On the head unit 4, there are mounted, in position, a CCD (charge coupled device) camera 20 for imaging an outside state, a touch sensor 21, for detecting the pressure resulting from a physical action, such as 'stroking' or 'patting' from the user, a distance sensor 22 for measuring the distance to an object positioned ahead, a microphone 23 for collecting the external sound, a loudspeaker 24 for outputting the sound, like whining, and LEDs (light emitting diodes) equivalent to the 'eyes' of the robot apparatus 1. Here, the CCD camera is image pickup means for imaging a face image in face identification.

The joint portions of the leg units 3A to 3D, connecting portions of the leg units 3A to 3D and the trunk unit 2, connecting portions of the head unit 4 and the trunk unit 2 and the connecting portion of a tail 5A of the tail unit 5 are provided with a number of actuators $25_1$ to $25_n$ and potentiometers $26_1$ to $26_n$ corresponding to the number of the degrees of freedom. For example, the actuators $25_1$ to $25_n$ include servo motors. The leg units 3A to 3D are controlled by the driving of the servo motors to transfer to a targeted posture or movement.

The sensors, such as the angular velocity sensor 18, acceleration sensor 19, touch sensor 21, floor contact sensors 23R/L, posture sensor 24, distance sensor 25, microphone 26, distance sensor 22, microphone 23, loudspeaker 24 and the potentiometers $25_1$ to $25_n$ are connected via associated hubs $27_1$ to $27_n$ to the signal processing circuit 14 of the controller 16, while the CCD camera 20 and the battery 17 are connected directly to the signal processing circuit 14.

The signal processing circuit 14 sequentially captures sensor data, picture data or speech data, furnished from the above-mentioned respective sensors, to cause the data to be sequentially stored over internal bus 15 in preset locations in the DRAM 11. In addition, the signal processing circuit 14 sequentially captures residual battery capacity data indicating the residual battery capacity supplied from the battery 17 to store the data thus captured in preset locations in the DRAM 11.

The respective sensor data, picture data, speech data and the residual battery capacity data, thus stored in the DRAM 11, are subsequently utilized when the CPU 10 performs operational control of the robot apparatus 1.

In actuality, in an initial stage of power up of the robot apparatus 1, the CPU 10 reads out a memory card 28 loaded in a PC card slot, not shown, of the trunk unit 2, or a control program stored in the flash ROM 12, either directly or through a PC card interface circuit 13, for storage in the DRAM 11.

The CPU 10 then checks its own status and surrounding statuses, and the possible presence of commands or actions from the user, based on the sensor data, picture data, speech data or residual battery capacity data, sequentially stored from the signal processing circuit 14 to the DRAM 11.

The CPU 10 also determines the next ensuing actions, based on the verified results and on the control program stored in the DRAM 11, while driving the actuators $25_1$ to $25_n$, as necessary, based on the so determined results, to produce behaviors, such as swinging the head unit 4 in the up-and-down direction or in the left-and-right direction, or moving the leg units 3A to 3D for walking or jumping.

The CPU 10 generates speech data as necessary and sends the so generated data through the signal processing circuit 14 as speech signals to the loudspeaker 24 to output the speech derived from the speech signals to outside or turns on/off or flicker the LEDs.

In this manner, the present robot apparatus 1 is able to behave autonomously responsive to its own status and surrounding statuses, or to commands or actions from the user.

(2) Software Structure of Control Program

Figure 3:
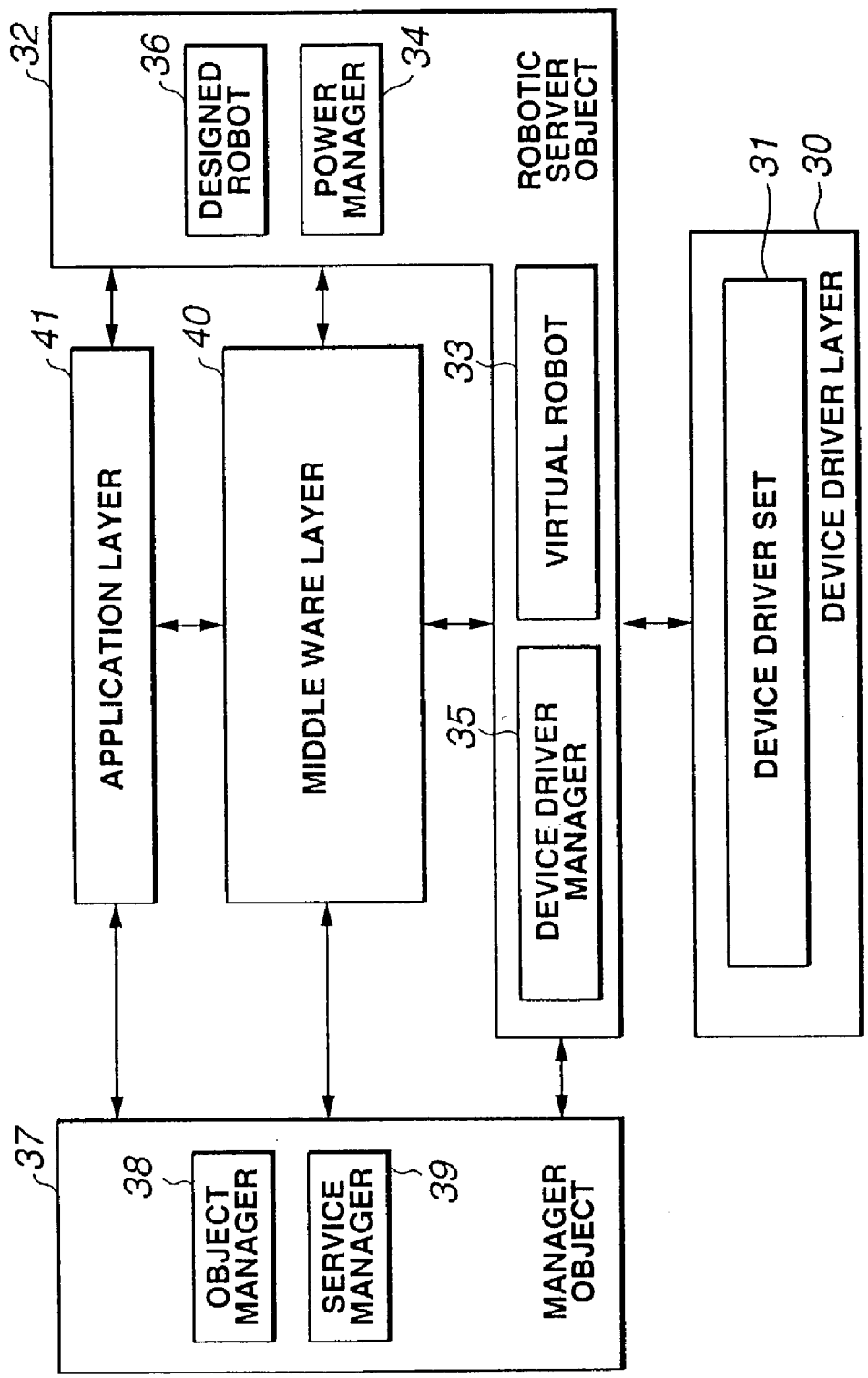
FIG. 3 is a block diagram showing a software structure of the robot apparatus.

FIG. 3 shows the software structure of the above-mentioned control program in the robot apparatus 1. In FIG. 3, a device driver layer 30 is positioned in the lowermost layer of the control program, and is formed as a device driver set 31 made up by plural device drivers. Each device driver is an object allowed to directly access the hardware used in a routine computer, such as an CCD camera 20 (FIG. 2) or a timer, and performs processing responsive to interruption from an associated hardware.

A robotics server object 32 is made up by a virtual robot 33, a power manager 34, comprised of a set of software items responsible for switching between power sources, a device driver manager 35, comprised of a set of software items, supervising various other device drivers, and a designed robot 36, comprised of a set of software items supervising the mechanism of the robot apparatus 1. The virtual robot 33, located in the lowermost layer of the device driver layer 30, is comprised of a set of software items furnishing an interface for accessing the hardware items, including the above-mentioned various sensors and actuators $25_1$ to $25_n$.

A manager object 37 is made up by an object manager 38 and a service manager 39. The object manager 38 is a set of software items supervising the booting and the end of respective software items included in the robotics server object 32, a middle ware layer 40 and an application layer 41, while the service manager 39 is a set of software items supervising the connection to respective objects based on the information on the connection among respective objects stated in a connection file stored in a memory card 28 (FIG. 2).

The middle ware layer 40 is positioned as an upper layer of the robotics server object 32, and is made up by a set of software items providing basic functions of the robot apparatus 1, such as picture processing or speech processing. The application layer 41 is located as an upper layer of the middle ware layer 40, and is a set of software items for deciding on the behavior of the robot apparatus 1 based on the results of the processing by the software items making up the middle ware layer 40.

Figure 4:
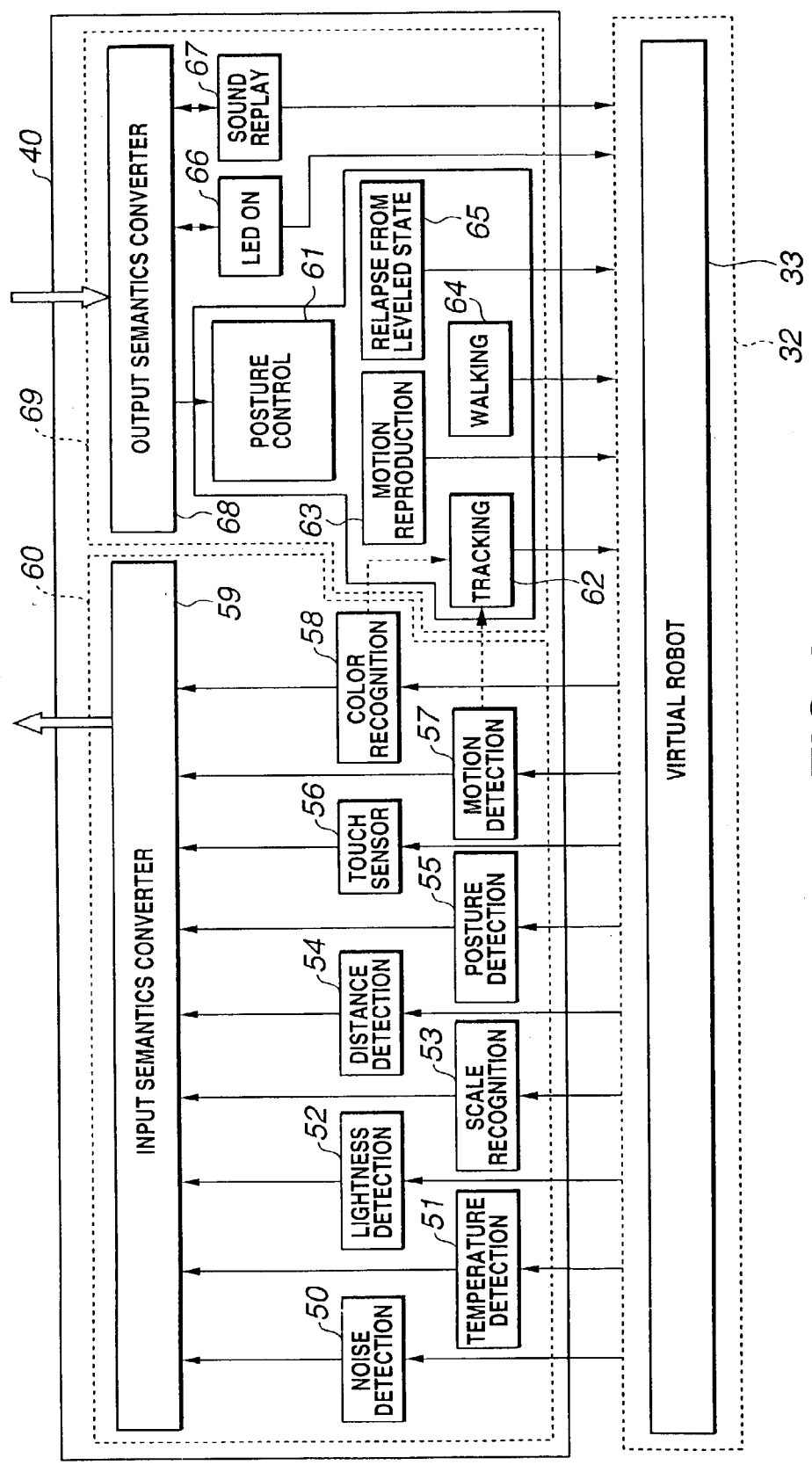
FIG. 4 is a block diagram showing a middle ware layer in the software structure of the robot apparatus.

FIG. 4 shows specified software structures of the middle ware layer 40 and the application layer 41.

Referring to FIG. 4, the middle ware layer 40 is made up by a recognition system 60, having signal processing modules 50 to 58 for noise-, temperature- or lightness detection, sound scale recognition, distance- or posture detection, for a touch sensor, for motion detection and for color recognition, and an input semantics converter module 68, and by an outputting system 69, having an output semantics converter module 68 and signal processing modules 61 to 67 for posture management, tracking, motion reproduction, walking, restoration from the falldown state, LED lighting and for sound reproduction.

The signal processing modules 50 to 58 of the recognition system 60 captures relevant data from the sensor data, picture data and the speech data, read out by the virtual robot 33 of the robotics server object 32 from the DRAM 11 (FIG. 2) to process the data and routes the processed results to the input semantics converter module 59. It is noted that the virtual robot 33 is constructed as a component for exchanging or converting signals in accordance with a preset communication protocol.

The input semantics converter module 59 recognizes the own status, the surrounding status, user's commands or actions, such as 'annoying', 'sultry', 'light', 'a ball has been detected', 'falldown is detected', 'stroked', 'patted', 'do-mi-so scale has been heard', 'a moving object has been detected', or 'an obstacle has been detected' to output the results of recognition to the application layer 41 (FIG. 3).

Figure 5:
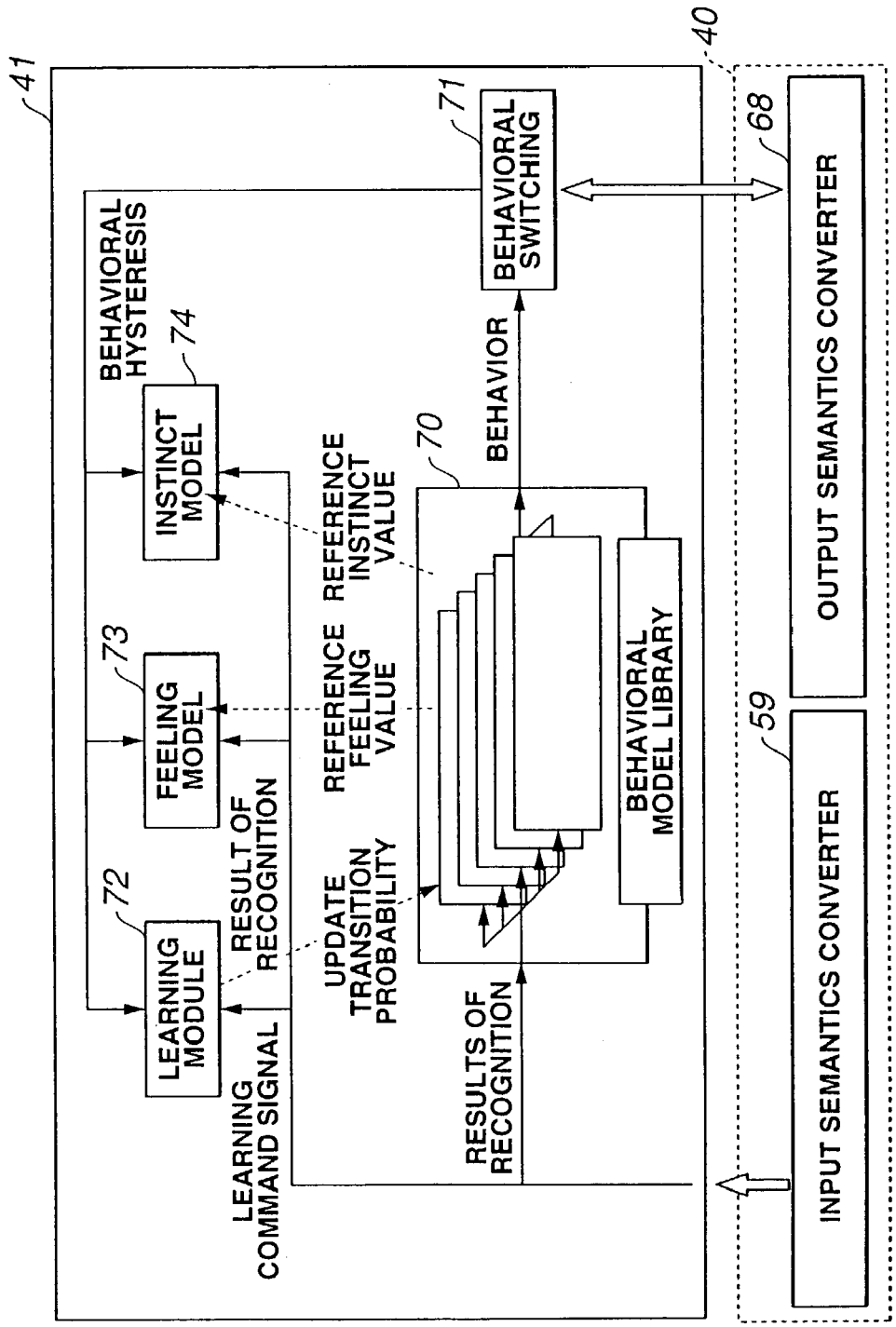
FIG. 5 is a block diagram showing the structure of an application layer in the software structure of the robot apparatus.

The application layer 41 is made up by five modules, namely a behavioral model library 70, a behavioral switching module 71, a learning module 72, a feeling model 73 and an instinct model 74, as shown in FIG. 5.

Figure 6:
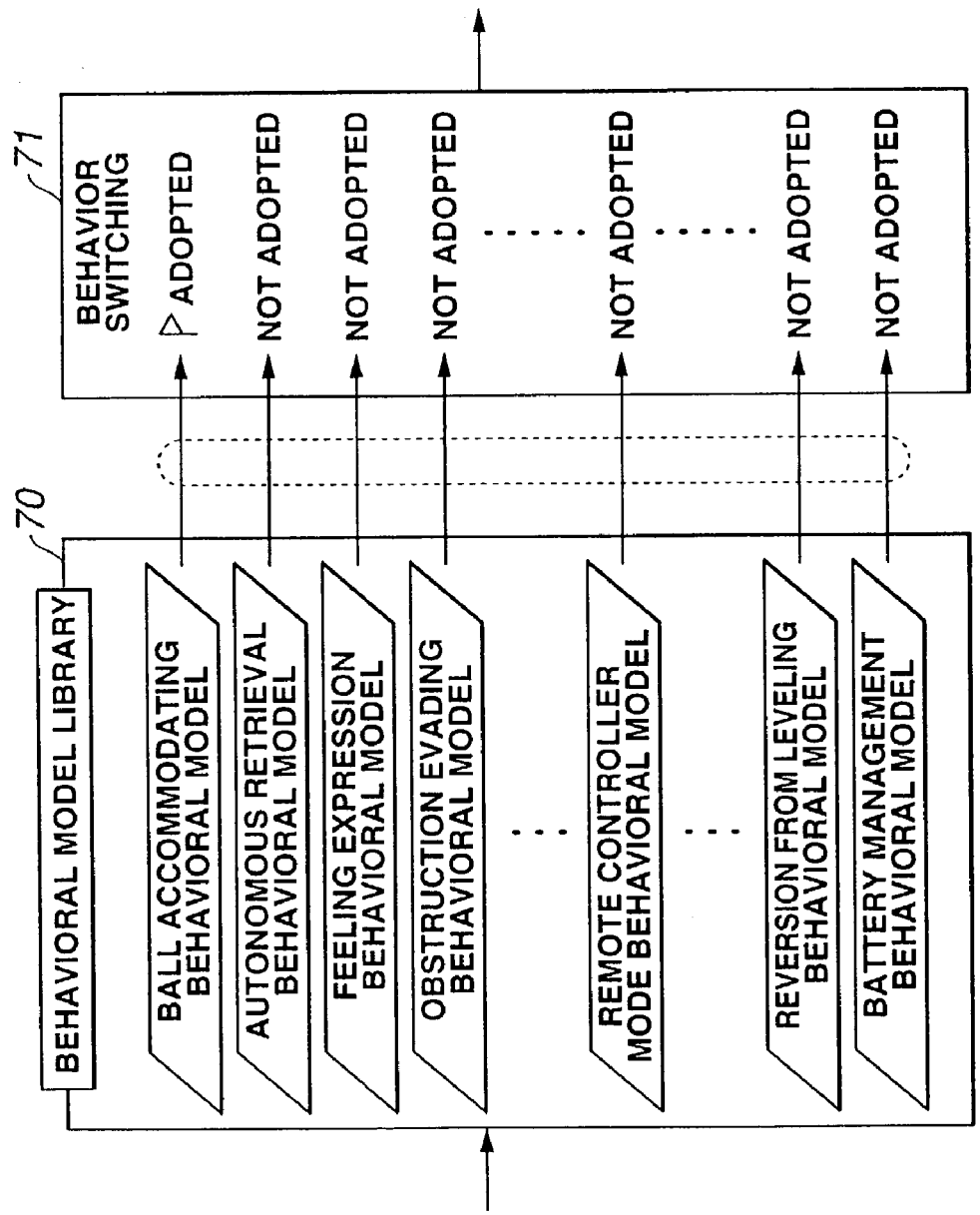
FIG. 6 is a block diagram showing the structure of a behavioral model library of the application layer.
Figure 7:
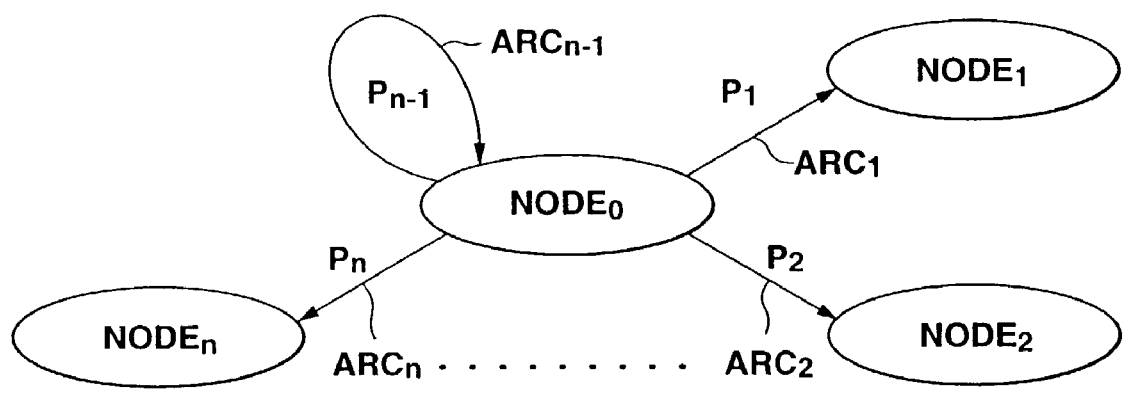
FIG. 7 illustrates a finite probability automaton as the information for behavior decision for the robot apparatus.

In the behavioral model library 70 there are provided respective independent behavioral models $70_1$ to $70_n$ in association with plural pre-selected condition items, such as 'residual battery capacity is small', 'restoration from the falldown state', 'an obstacle is to be evaded', 'the feeling is to be expressed' or 'a ball has been detected', as shown in FIG. 6.

When the results of recognition are provided from the input semantics converter module 59 or a preset time has elapsed as from the time the last results of recognition were provided, the behavioral models $70_1$ to $70_n$ decide on the next behaviors, as they refer to parameter values of the emotion as held by the feeling model 73 and to parameter values of the corresponding desires as held by the instinct model 74, to send the results of decision to the behavioral switching module 71.

In the present embodiment, the behavioral models $70_1$ to $70_n$ use an algorithm, termed finite probability automaton, as a technique of deciding on the next behavior. This algorithm probabilistically determines from which one of the nodes (states) $NODE_0$ to $NODE_n$ to which one of these nodes $NODE_0$ to $NODE_n$ transition is to be made, based on the values of the transition probability $P_1$ to $P_n$ as set for the arcs $ARC_1$ to $ARC_n$ interconnecting the respective nodes $NODE_0$ to $NODE_n$.

Specifically, each of the behavioral models $70_1$ to $70_n$ includes a status transition table 80, shown in FIG. 8, for each of the nodes $NODE_0$ to $NODE_n$, forming the own behavioral models $70_1$ to $70_n$, in association with these nodes $NODE_0$ to $NODE_n$.

In the status transition table 80, input events (results of recognition), as the conditions for transition in the nodes $NODE_0$ to $NODE_n$, are listed in the column of the 'input event name', in the priority order, and further conditions for the transition condition are stated in associated rows of the columns 'data name' and 'data range'.

Thus, in the node $NODE_{100}$, shown in the status transition table 80 of FIG. 8, given the results of recognition 'ball has been detected' (BALL), the ball size (SIZE) being 'from 0 to 1000', as given along with the results of recognition, represents a condition for transition to another node. Similarly, given the results of recognition 'an obstacle has been detected' (OBSTACLE), the distance (DISTANCE) to the obstacle being in a range 'from 0 to 100', as given along with the results of recognition, represents a condition for transition to another node.

Also, in the present node $NODE_{100}$, if no results of recognition are input, but any one of the parameter values 'joy' (JOY), surprise (SURPRISE) or 'sadness' (SADNESS) among the parameter values of the respective emotion and desires, as held in the feeling model 73, among the parameter values periodically referenced by the behavioral models $70_1$ to $70_n$, is in a range between '50 and 100', transition may be made to another node.

Moreover, in the status transition table 80, the node names to which transition can be made from the node $NODE_0$ to $NODE_n$ are shown in the row 'nodes of destination of transition' in the column 'probability of transition to other nodes'. Additionally, the probability of the transition to other nodes $NODE_0$ to $NODE_n$, enabled when all conditions stated in the columns 'input event name', 'data name' and 'data range' are met, is entered in corresponding locations in the column 'probability of transition to other nodes'. The behaviors to be output on the occasion of transition to the nodes $NODE_0$ to $NODE_n$ are indicated in the row 'output behavior' in the column 'probability of transition to other nodes'. Meanwhile, the sum of the probability values of each row in the column 'probability of transition to other nodes' is 100%.

Thus, in the node $NODE_{100}$ represented by the status transition table 80 of FIG. 8, given the results of recognition that 'the ball has been detected' and that the size (SIZE) of the ball is in a range from '0 to 1000', transition to the 'node $NODE_{120}$ (node 120)' can be made with the probability of 30%, and the behavior 'ACTION 1' is then output.

In each of the behavioral models $70_1$ to $70_n$, a plural number of the sets of the nodes $NODE_0$ to $NODE_n$, each stated as this status transition table 80, are concatenated together, such that, given the results of recognition from the input semantics converter module 59, the next behavior is probabilistically determined by exploiting the status transition tables of the $NODE_0$ to $NODE_n$ and the results of the decision are output to the behavioral switching module 71.

The behavioral switching module 71, shown in FIG. 5, sends to the output semantics converter module 68 of the middle ware layer 40 a command to select the behavior output from one of the behavioral models $70_1$ to $70_n$, having a preset high priority order, among the behaviors output from the respective behavioral models $70_1$ to $70_n$ of the behavioral model library 70, and to execute the behavior. This command is referred to below as a behavioral command. In the present embodiment, the order of priority of a given one of the behavioral models $70_1$ to $70_n$ shown in FIG. 6 is the higher the lower the rank of the behavioral model in question in FIG. 6.

The behavioral switching module 71 notifies the learning module 72, feeling model 73 and the instinct model 74 of the effect of the termination of the behavior, based on the behavior completion information afforded from the output semantics converter module 68 after the end of the behavior.

The learning module 72 is fed with the results of recognition of the instructions received as an action from a user, such as 'patting' or 'stroking', from among the results of recognition provided from the output semantics converter module 68.

The learning module 72 changes the probability of transition of the behavioral models $70_1$ to $70_n$ in the behavioral model library 70, based on the results of recognition and on the notification from the behavioral switching module 71, such that, when the action is 'patting' ('scolding') or 'stroking' ('praising'), the probability of occurrence of the behavior in question will be increased or decreased, respectively.

On the other hand, the feeling model 73 is holding parameters representing the intensity of each of the six emotion types, namely joy (JOY), sadness (SADNESS), anger (ANGER), surprise (SURPRISE), disgust (DISGUST) and fear (FEAR). The feeling model 73 periodically updates the parameter values of these emotion types, based on the particular results of recognition provided by the input semantics converter module 59, such as 'patted' or 'stroked', time elapsed and on the notification from the behavioral switching module 71.

Specifically, the feeling model 73 calculates a parameter value E[t+1] of the current emotion type for the next period in accordance with the following equation (1):

$$E[t+1]=E[t]+ke \times \Delta E[t] \quad (1)$$

where $\Delta E[t]$ in the amount of variation of the emotion type as calculated by a preset equation based on, for example, the results of recognition provided by the input semantics converter module 59, the behavior of the robot apparatus 1 at the pertinent time or on the time elapsed as from the previous updating event, E[t] is the current parameter value of the emotional type and ke is a coefficient representing the sensitivity of the emotion type. The feeling model 73 substitutes the so calculated value for the current parameter value E[t] of the emotion type to update the parameter value of the emotion type. In similar manner, the feeling model 73 updates the parameter values of the totality of the emotion types.

Which effect the respective results of recognition and the notification from the output semantics converter module 68 will have on the variation of the parameter values of the respective emotion types $\Delta E[t]$ is predetermined, such that the results of recognition 'patted' significantly affects the amount of variation $\Delta E[t]$ of the parameter value of the emotion type 'anger', while the results of recognition 'patted' significantly affects the amount of variation $\Delta E[t]$ of the parameter value of the emotion type 'joy'.

The notification from the output semantics converter module 68 is the so-called behavior feedback information (behavior end information) and the information concerning the results of occurrence of the behavior. The feeling model 73 also changes the feeling based on this information. For example, the feeling level of anger may be lowered by the act of 'barking'. Meanwhile, the notification from the output semantics converter module 68 is also input to the learning module 72, which then changes the corresponding transition probability of the behavioral models $70_1$ to $70_n$ based on this notification.

Meanwhile, the feedback of the results of the behavior may be made by an output of the behavioral switching module 71 (behavior seasoned with the feeling).

On the other hand, the instinct model 74 holds the parameters, representing the intensity of four reciprocally independent desires, namely 'desire for exercise' 'desire for affection', 'appetite' and 'curiosity'. The instinct model 74 periodically updates the parameter values of these desires, based on the results of recognition provided from the input semantics converter module 59, time elapsed and on the notification from the behavioral switching module 71.

Specifically, as concerns the 'desire for exercise', 'desire for affection' and 'curiosity', the instinct model 74 calculates, at a preset period, the parameter value I [k+1] of these desires at the next period, using the following equation (2):

$$I[k+1]=I[k]+ki \times \Delta I[k] \quad (2)$$

where $\Delta I[k]$ is the amount of variation of the desire in question at a pertinent time as calculated by a preset equation based on the results of recognition, time elapsed and the notification of the output semantics converter module 68, I[k] is the current parameter value of the desire and ki is the coefficient representing the sensitivity of the desire in question, and substitutes the calculated results for the current parameter value I[k] to update the parameter value of the desire. The instinct model 74 updates the parameter values of the respective desires except the 'appetite'.

The effect of the results of recognition and the notification from the output semantics converter module 68 on the amount of variation $\Delta I[k]$ of the parameter values of the respective desires is predetermined, such that, for example, the notification from the output semantics converter module 68 significantly affects the amount of variation $\Delta I[k]$ of the parameter values of 'fatigue'.

In the present embodiment, the parameters of the respective emotion types and the respective desires (instincts) are varied in a range from 0 to 100, while the values of the coefficients ke and ki are also set individually for the respective emotion types and for respective desires.

The output semantics converter module 68 of the middle ware layer 40 sends abstract behavioral commands, such as 'go ahead', 'joy', 'cry', or 'tracking (track a ball)', provided by the behavioral switching module 71 of the application layer 41, as described above, to the signal processing modules 61 to 67 of the output system 69, as shown in FIG. 4.

Given a command for a behavior, the signal processing modules 61 to 67 generates servo command values to be supplied to the associated actuators $25_1$ to $25_n$ (FIG. 2) to execute the behavior, speech data of the sound to be output from the loudspeaker 24 (FIG. 2) and/or driving data to be supplied to the LED of the 'eye', based on the behavioral command, and send these data through the virtual robot 33 of the robotics server object 32 and the signal processing circuit 14 (FIG. 2) in this order to the associated actuators $25_1$ to $25_n$, loudspeaker 24 or to the LED.

In this manner, the robot apparatus 1 is able to perform an autonomous behavior, based on the control program, responsive to its own internal state, surrounding state (exterior state) or to the command or action from the user.

(3) Face Identification by a Robot Apparatus (3-1) Principle of Face Identification Applied to a Robot Apparatus The robot apparatus 1 acts autonomously, responsive to the information from outside or to its own internal state, as described above. With this robot apparatus 1, the problem of face identification and the task of face identification, such as are encountered in the prior-art technology, is overcome by the following three techniques:
(i) face detection from a complex scene;
(ii) real-time face tracking; and
(iii) face identification.

The face detection technique may be roughly classed into the technique of employing color, technique of employing movements and the technique of employing patterns, for discriminating objects. Of these, the technique of employing face patterns for slicing a face accurately from a complex scene is by far the most efficient. However, searching for a face of the full scale across the entire scene imposes a severe load and hence this technique has not so far been used except for still images.

On the other hand, the majority of systems detecting the face in real-time are by skin color detection. However, since the color is changed depending on the conditions of illumination, while the skin color varies depending on the race or individual difference, only simple skin color recognition does not prove effective means.

Thus, by application of the present invention, the technique is used which executes real-time face tracking based on the distribution of colors contained in the as-detected face pattern, and which adapts face detection to dynamic changes resulting from the tracking. This renders it possible to shorten the processing time in face detection.

Moreover, for face identification, face images sliced by pattern search are used. By deeming the results of identification as those for the same face, as long as tracking continues to be successful, it is rendered possible to give a comprehensive decision from plural results of identification.

The processing for face identification, executed on the robot apparatus 1, is such that (i) face detection from a complex scene is by face detection by a luminance pattern by luminance patterns (face recognition), (ii) real-time face tacking is by face tracking by color (face tracking) and (iii) face identification is by personal identification exploiting a differential face.

Figure 9:
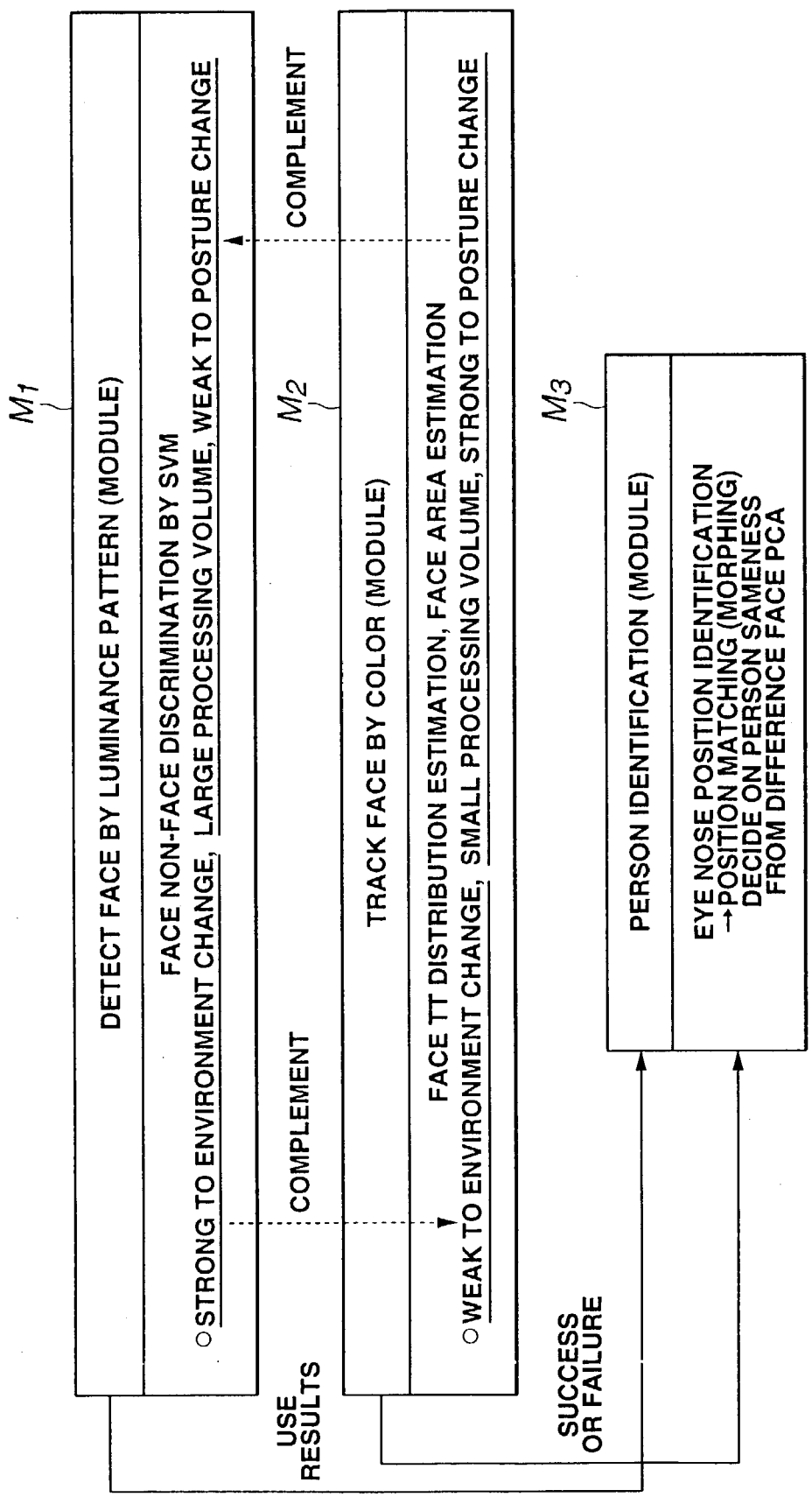
FIG. 9 illustrates various processing operations in face identification.

For example, each such processing in the robot apparatus 1 is implemented as a module or as an object. That is, the robot apparatus 1 includes a face tracking module $M_2$, a face detection module $M_1$ and a face discriminating module $M_3$, as shown in FIG. 9. It should be noted that the face tracking module $M_2$ operates as face tracking means for tracking a face changing in an image photographed by a CCD camera 20, the face detection module $M_1$ operates as face data detection means for detecting face data of a face in an image photographed by pick-up means, based on the face tracking information by the face tracking module $M_2$ and the face discriminating module $M_3$ operates as face identification means for discriminating a specified face based on face data as detected by the face detection module $M_1$.

In the face detection by luminance patterns, the processing of detecting (recognizing) a face from an input image is carried out. Specifically, in this face detection, face non-face discrimination is by a support vector machine (SVM). This processing usually features invulnerability to changes in environment, voluminous calculations involved and vulnerability to changes in the posture. An example of the changes in environment is change in ambient illumination.

In the face tracking by color, the processing of tracking a face in an input image is carried out. Specifically, in this face tracking, face color distribution and face area estimation are carried out. This processing usually features vulnerability to change in environment, only scanty calculations involved and invulnerability to change in the posture.

In personal identification, the processing of face identification is carried out, using a face, as recognized by the above-mentioned face detection, as a specified face. In more detail, this personal identification performs eye-nose position identification to effectuate position matching (morphing) and personal identification from the differential face PCA.

In the face identification system, the above-mentioned processing is shared by respective steps in face identification in a reciprocally complementing fashion to enable high precision face detection. For example, the following processing operations represent reciprocally complementing relationship:

For example, the face tracking by color, which is vulnerable to changes in environment, is eked out by face detection by luminance patterns, which is invulnerable to environment. Conversely, face detection by luminance pattern, which is in need of voluminous calculations and vulnerable to changes in posture, is eked out by face tracking by color, which is of scanty calculation volume and invulnerable to changes in posture.

In sum, the following may be said. The face detection, which inherently is in need of voluminous calculations, is difficult to achieve in real-time. However, the processing load may be relieved by carrying out the operation at a preset timing. On the other hand, detection of the face position from within the input image at each timing increases the load.

Thus, in case face changes in an input image are tracked in real-time by exploiting the processing invulnerable to changes in the posture and the face detection processing is carried out only with respect to the estimated face position in the input image, face detection becomes feasible in such a state that the face position has already been specified. That is, by combining the processing which is rough but quick with the processing which is highly reliable but slow, and by sharing the operation, the respective processing operations may eke out each other in the perspective of the entire system to enable concerted real-time face detection.

This enables a large number of results of face detection to be acquired in short time, such that high precision face identification becomes possible by carrying out face identification based on the face detection results and by statistically processing such processing operations.

By this face identification system, the robot apparatus 1 automatically performs the entire processing of finding a human being from a scene (face detection processing), gazing at the face so found out (face tracking processing) and identifying a person based on face identification employing the resulting information to realize the face identification of high reliability. This assures spontaneous interaction between the robot apparatus and the human being. In the following, the respective processing operations of face detection, face tracking and face identification are specifically explained.

(3-2) Face Detection

As for face detection, face non-face discrimination is performed using a support vector machine (SVM) which is currently expected to be of the highest ability in learning generalization and which is now attracting attention in the field of pattern recognition.

Typical of this technique is a technique disclosed in a report by B. Sholkopf et al. (B. Sholkopf, C. Burges, A. Smola, 'Advance in Kernel Methods Support Vector Learning'. The MIT Press, 1999) or a technique disclosed in a report by V. Vapnik (V. Vapnik, 'The Nature of Statistical Learning Theory Second Edition', Springer, 1999). The results of preliminary experiments, conducted by the present inventors, have revealed that, as compared to main component analyses or to the technique employing neural networks, the technique disclosed here gives highly satisfactory results.

The aforementioned SVM is a learning machine which employs a linear discriminator (Perceptron) as a discriminating function, and is capable of extension to a non-linear space by employing the kernel function. Moreover, in the learning of the discriminated function, the class-to-class margin is set to a maximum value and its solution is obtained by solving the order-two mathematical programming, so that it can be theoretically assured that a global solution can be reached. The following are details of this technique. An input image is prepared by the following technique.

First, a 20×20 pixel image is sliced from a scene. Then, four corners of the image are masked for removing the background portions other than the face from the so sliced image. The luminance gradient due to illumination is then corrected, on the presupposition that the luminance of the object being imaged will be changed with illumination, to apply histogram smoothing or contrast normalization.

The discrimination function used for face detection then is learned. First, as data for learning, a provisional discrimination function is obtained, using a preset number, such as 30, of each of face data and non-face data. The discrimination function, provisionally obtained in this manner, is then tested on images on various databases, to detect faces. The images which met with success in detection and those which met with failure in detection are held as face data and as non-face data, respectively. These face data and non-face data are added to learning data, and re-learning then is carried out.

By way of an embodiment, the above processing is repeatedly carried out on hundreds of images, as a result of which 389 face data and 576 non-face data could be accumulated. These face data differ as to race, expressions, hair styles, moustache, spectacles or illumination conditions, except that the faces direct forwards, from which expectations may be made that learning may be achieved by a discrimination unit, such as a discrimination module, which is not affected by the above conditions. A preset number of, for example, 255, support vectors, thus obtained, are used.

The processing of face detection, as described above, is carried out for an area estimated to be a face area in an image being followed in the face tracking processing as later explained. That is, in the face detection, the processing is carried out only for a retrieval area delimited by the face tracking processing, thereby enabling the highly reliable face detection processing to be achieved in short time.

It is noted that this face detection processing is constructed in the robot apparatus 1 as a module or as an object.

(3-3) Face Tracking

The face tracking continuously follows a face changing, in particular moving, in an image, for delimiting an area of retrieval to be processed for face detection in the aforementioned face detection. In particular, in the case of the autonomously acting robot apparatus 1, in which the face position in the image is changed, the face follow-up processing in the image operates effectively in the face identification.

This face tracking is based on color area tracking in consideration of the scantiness of the processing volume, face posture changes or invulnerability to occlusion.

For example, a report by Yang et al. (J. Yang, W. Lu and A. Waibel, 'Skin-Color Modeling and Adaptation', Technical Report of CMU, CMU-CS-97-146, 1997) indicates that skin color distribution has been empirically determined to be the distribution close to normal distribution on the (r, g) plane obtained from the equations (3) and (4):

$$r = \frac{R}{R+G+B} \tag{3}$$

$$g = \frac{G}{R+G+B} \tag{4}$$

normalized with luminance, without dependency on the individual difference or race.

Moreover, in the above report, Yang et al. express the parameter estimation value of the normal distribution, representing the color in the color space, by the equations (5) and (6):

$$\hat{\mu} = \sum_{j=1}^{r} \alpha_j m_j \tag{5}$$

$$\hat{\sigma} = \sum_{j=1}^{r} \beta_j s_j \tag{6}$$

of the linear summation of data estimated in the past, and derive the rule for updating weighting coefficients $\alpha_j$, $\beta_j$ by maximum likelihood estimation.

The above equations (5) and (6) denote an averaging and variance, respectively, $m_j$ and $S_j$ are an averaged value and a variance of past j steps, respectively, and r is the number of the maximum hysteresis.

The present technique executes adaptive tracking of the skin color area based on this formulation. The present technique also segments pixels, extracted using a color model, on image area. Specifically, the size, position or tilt of an ellipsis, specifying an area for acquiring distribution data, is changed with respect to pixels obtained from a color model, to find a best matched ellipsis in the vicinity of the face position in the previous frame. It should be noted that the size, position and the tilt of the ellipsis for acquiring the distribution data are changed in order to cope with changes in the distance to the face, movement or tilt caused to the face, as an example.

Figure 10:
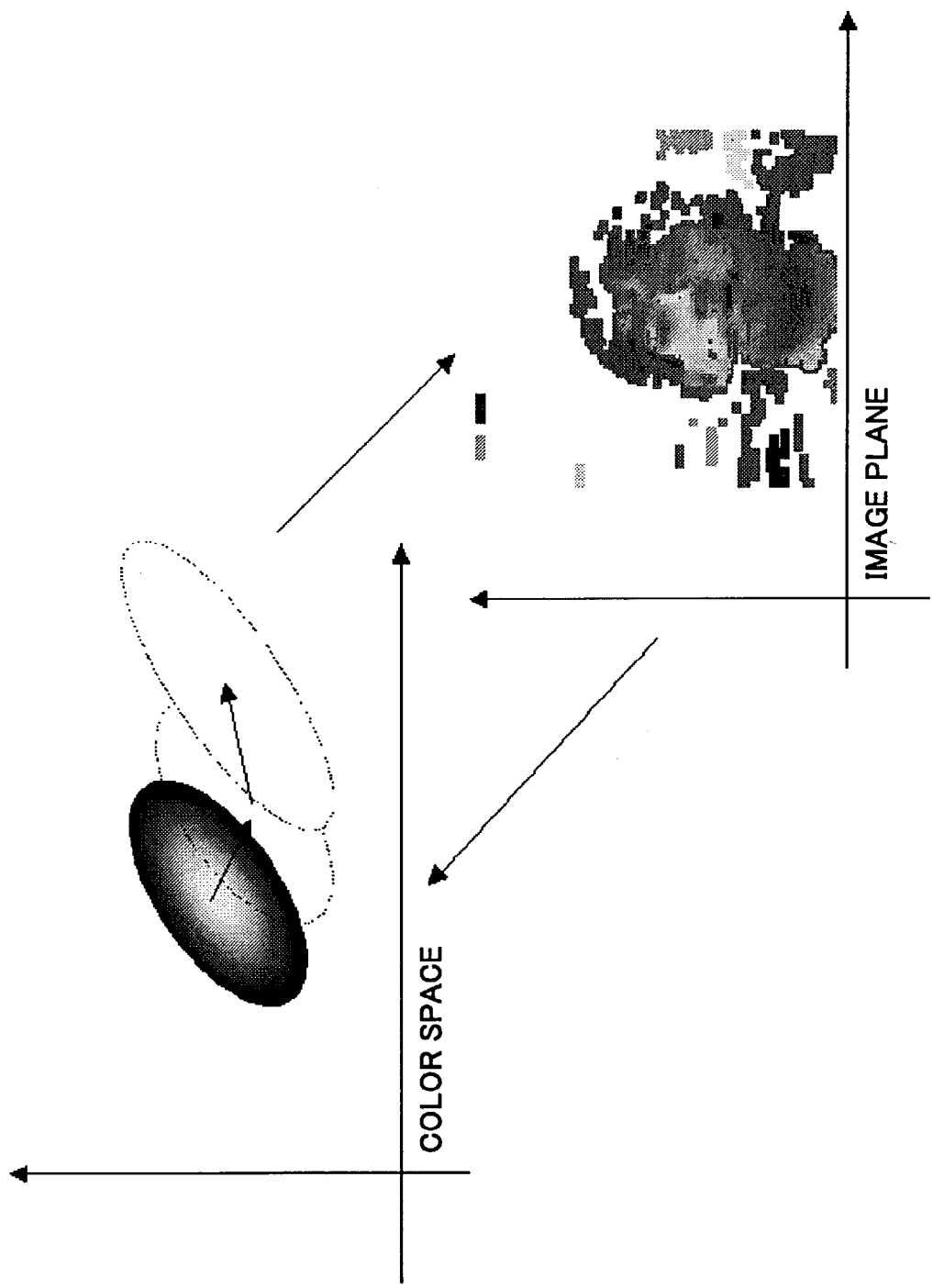
FIG. 10 illustrates face tracking.

FIG. 10 shows a processing example in case tracking constraint is imposed from both directions of the color space and the position on the image. The color distribution of the face area in the image plane which is estimated to comprise a face area is mapped to the color space. In this color space, tracking by color distribution estimation is performed to estimate changes of the color distribution with time and the face area is estimated on the image plane using the estimated color.

By imposing tracking constraint from both directions of the color space and the position on the image, the face skin color can be followed, more or less stably, even in cases wherein there are like colors in the scene or the illumination conditions are varied. By tracking the face as described above, it is possible to follow a face moving in an image. In the face detection, the processing of detection is carried out for the area specified by this face tracking to acquire processed data. Since the processing for face detection may be carried out for a limited area being followed so that reliable processing can be executed with a smaller processing volume to acquire the processed results in a short time.

Meanwhile, this face followup processing is constructed in the robot apparatus 1 as a module or as an object, as described above.

(3-4) Face Identification

In the face identification, a specified face is identified using the face data obtained by the above-described face detection. Specifically, this face identification is by checking to see if the persons in two given face images are one person or two different persons. This decision is given on the basis of a differential image of two face images. Meanwhile, this face identification processing is constructed as a module or as an object in the robot apparatus 1.

Specifically, in the face identification, the difference of two face images of the same person is found at the outset at a learning stage. By referencing this difference, it is verified, from the results of difference between the two face images, if the persons in two given face images are one person or two different persons.

In this learning stage, the difference between two face images of the same person is found to generate a set of difference images of the same person (intra-personal class) and eigenvalue-expanded to acquire an eigenvalue space of the intra-personal class which is retained to be the characteristic space. The technique of this sort of the learning technique may be exemplified by a technique disclosed in a report by B. Moghaddam (B. Moghaddam, W. Wahid, A. Pentland, 'Beyond Eigenfaces: Probabilistic Matching for Face Recognition', MIT Media Lab. Perceptual Computing Section Technical Report No.443, 1998).

The processing of face identification, implemented through this learning, is as follows: First, in order to acquire the difference between two face images, the face position must be found accurately. Since the positions of the eyes and the noses differ from person to person, these positions need to be normalized. Here, the positions of the eye and the nose are identified by matching the eigeneye and the eigennose to the produced face image and rotation-expansion (morphing) by affine transform is carried out so that the eyes and the noses as detected will be at as-set positions.

Through this morphing, the difference between the input facer image and the face image in the database, retained to be registered face image data in the database, is produced. The face image, stored in the database, may be registered at the outset. The face image stored as the database may also be updated or stored anew.

For example, the robot apparatus 1 is able to newly register a face image, photographed in an image pickup mode of photographing an image, in the database. For example, the robot apparatus 1 includes image pickup mode of photographing an image by a user's command and is able to newly register a face image, photographed by such user command, in the database. The imaging command from the user may be exemplified by speech commands, such as by a speech running: 'image a face'. By so doing, the face image database may be constructed at the same time as the entertainment character of the robot apparatus is maintained. The face image stored at the outset in the database may, for example, be a face image of each person who is directing forwards.

Then, a person is identified, based on the difference image, obtained as described above, and on the eigenspace described above. Specifically, the distance between a difference image and the intra-personal class (distance from feature space or DFFS) and the distance between a point obtained on projecting the difference image on the intra-personal space and the point of origin (distance in the feature space or DIFS) are calculated. For example, if it is assumed that the differential image of the same person follows the normal distribution in the intra-personal space, the sum of the DFFS and the DIFS (DFFS+DIFS) represents the distance from the distribution. The smaller this difference, the higher is the probability that the two persons represent the same person. By exploiting this relationship, the database image having the highest probability of being the face of the same person as the input face image is determined to be the person in the scene. If the difference value is small, the difference image is a singsong face, or what may be called a smooth blank face.

Moreover, the tracking information by face tracking (followup) is exploited to store the probabilistic values chronologically. That is, as long as tracking is successfully made, the results of face identification, described above, are chronologically acquired, for each of consecutive scenes, and the identified results are processed statistically, under such constraint that these results are of the same person. The result is that, if momentary misconception should occur, it is less likely to affect the entire system, thus achieving highly reliable face identification.

It is noted that the robot apparatus 1 is acting autonomously, as described above, such that the orientation or the size of the face in the photographed image cannot be said to be constant. Additionally, only several face images of each of plural persons, directing substantially forwards, are provided as pre-stored face images in the database.

If it is attempted to discriminate a face under these conditions, it may be feared that mistaken results of identification may be produced. However, by executing face identification processing for each of consecutive scenes as long as the tracking is successfully made, acquiring many results of identification and by executing statistical processing under the constraint that the results of identification are of the same person, face identified of high reliability may be realized for the entire system, even if momentarily mistaken identification results are produced.

It may be advisable to provide all patterns of the face images for all individual persons. However, if profile data, for example, are provided in this manner, the volume of data to be stored would be unrealistically increased.

In the foregoing, explanation has been made of face identification applicable to the robot apparatus 1, roughly classified into face detection, face tracking and face (person) identification. In this robot apparatus 1, face identification is executed by combination of half-tone face pattern detection by SVM, a tracking technique employing adaptive updating of the skin color model and the face area and person identification employing differential face eigenvalue expansion. This face identification is implemented as a total face identification system which operates robustly in real-time and in real-environment.

By tracking face changes in an input image by exploiting a system having a small processing volume and which is invulnerable to changes in posture, and by performing the processing of detecting a face only for an estimated face position in the input image as obtained from the tracking results, face detection processing becomes possible in such a state that the face position has been identified. On the other hand, since a large number of results of face detection can be acquired in short time, face detection to high accuracy may be enabled by performing the processing of face identification based on the results of face detection and statistic processing.

By the above-described face identification system, the entire processing comprising finding a human being from a scene (face detection processing), gazing at it (face tracking processing) and personal identification by face identification employing the resulting information (personal identification processing) may be executed automatically to realize face recognition to high reliability. This assures spontaneous interactions between the robot apparatus and the human being. An embodiment of the present invention is now explained.

(3-5) Embodiment

Figure 11:
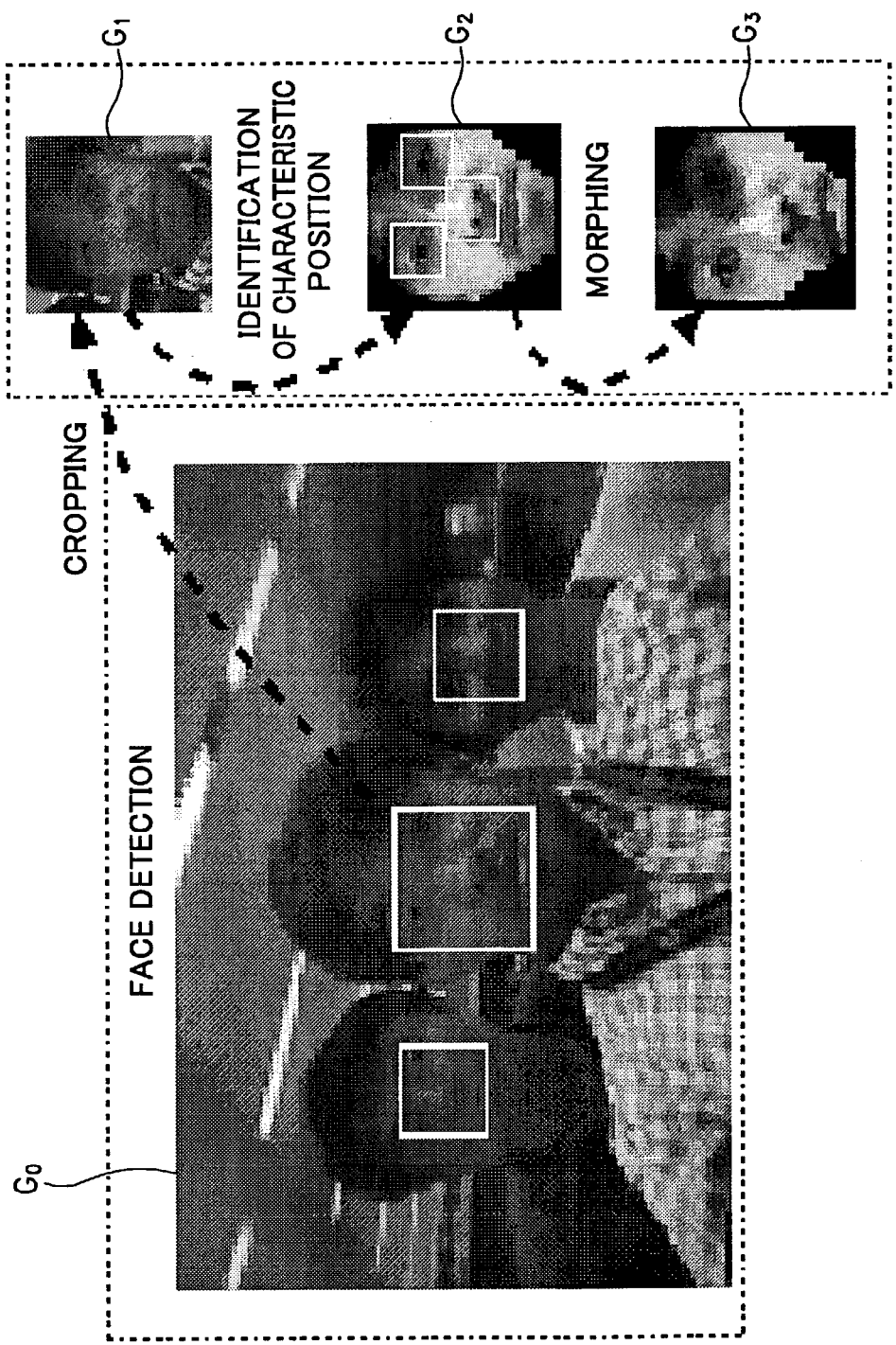
FIG. 11 illustrates processing as from face slicing from an input image until its morphing, carried out in the face detection processing and in the face discriminating processing.
Figure 12:
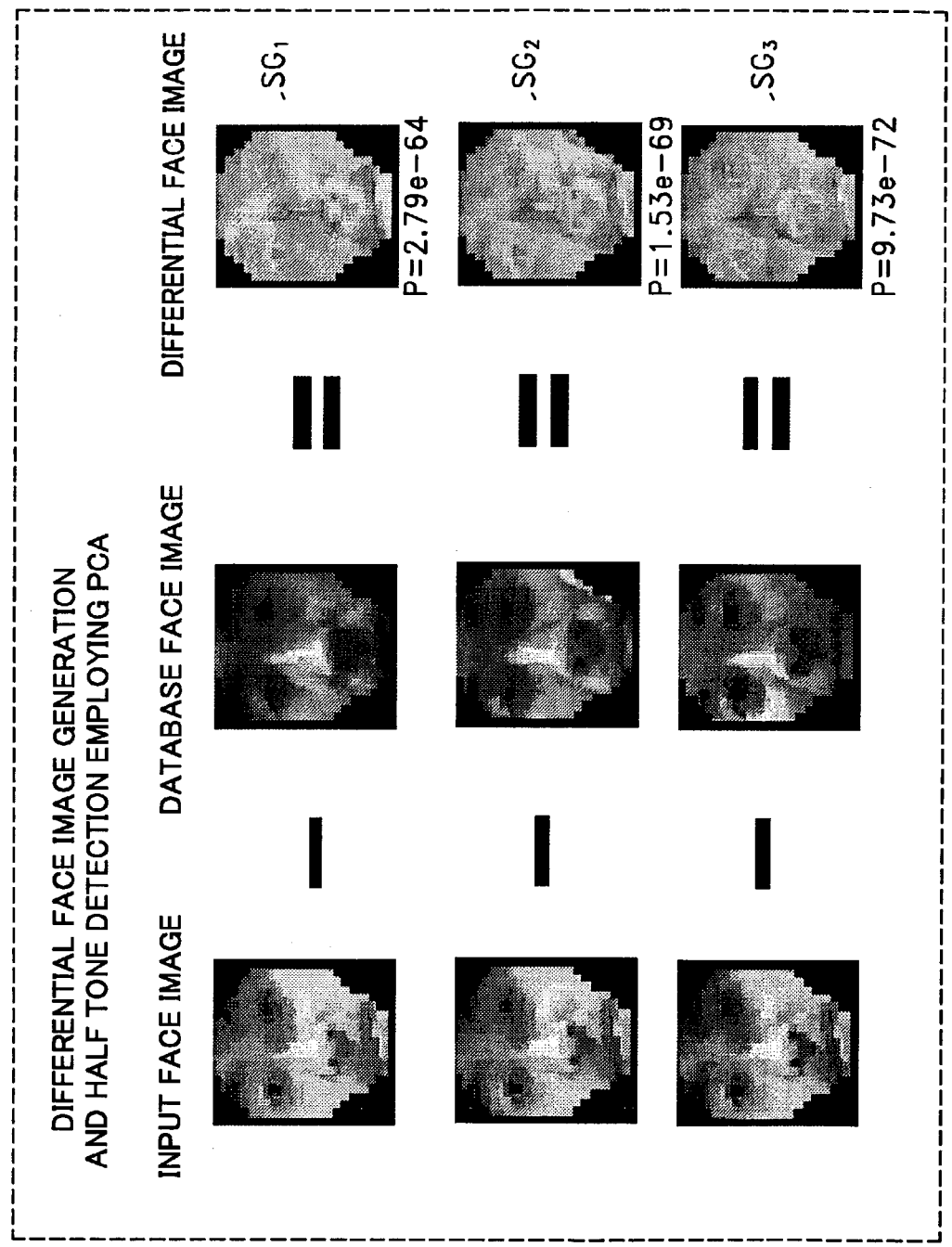
FIG. 12 illustrates the processing in producing a differential image of a face, carried out in the face discriminating processing.

FIGS. 11 and 12 show a sequence of operations from face detection to face identification. As the operating conditions, it is now assumed that face detection from the entire scene of 176×120, taking a few stages of scaling into consideration, is carried about in approximately 5 sec, and that color tracking is carried out at a period of 50 msec.

In the face detection processing, a face image $G_1$ is sliced from an input image $G_0$, as shown in FIG. 11. Then, four corners of the image are masked, as indicated for the face image $G_2$, to remove the background portion. In the face identification processing for identifying a person, a morphed face image $G_3$ is acquired. This processing is carried out chronologically in keeping with the face tracking processing.

In the face identification processing, difference is taken of the face image $G_3$, obtained by morphing as described above, and face images $DG_1$, $DG_2$, $DG_3$, . . . , previously obtained at the learning stage. This field difference face images $SD_1$, $SD_2$, $SD_3$, . . . . In the present embodiment, the probability is maximum that a person, whose face has been contained in the input image, is the same person as that of the third face image $DG_3$ of the database with the difference value of $P=9.73e^{-72}$. In the present embodiment, 123 of 169 image pairs of the same persons (72.8%) were identified to be of the same person, whereas, of 4093 of 5609 image pairs of the different persons (73.0%) were identified to be of different persons.

INDUSTRIAL APPLICABILITY

In accordance with the present invention, a robot apparatus is able to detect face data of a face changing in an image, as the face is being detected, and to identify a person based on the so detected face data. Thus, the robot apparatus is able to identify the user (keeper) from many persons to improve its user entertaining properties.

The invention claimed is:

1. An autonomously acting robot apparatus comprising:
   image pickup means;
   face data tracking means for tracking a face changing in an image photographed by said image pickup means;
   face data detecting means for detecting face data of the face in the image photographed by said image pickup means, based on the face tracking information by said face tracking information;
   face identification means for identifying a specified face based on said face data as detected by said face data detection means; and
   learning means for using a difference between registered face data previously obtained and face data detected by said face data detection means to acquire a learned difference value to establish a characteristic space by said learned difference value.

2. The robot apparatus according to claim 1 wherein said face data detecting means is a support vector machine for discriminating the face and the non-face.

3. The robot apparatus according to claim 1 wherein said face tracking means tracks at least one of the movement and the shape change of said face in said image as face changes in said image.

4. The robot apparatus according to claim 1 wherein said face tracking means is object tracking means for tracking an object in the image based on color and for tracking the so specified object;
   said object tracking means tracking an object specified by a preset color and tracking said object as said face.

5. The robot apparatus according to claim 4 wherein said face tracking means tracks said face by exploiting color distribution.

6. The robot apparatus according to claim 5 wherein said face tracking means tracks said face by normal distribution obtained on normalizing said color distribution.

7. The robot apparatus according to claim 1 wherein said face identification means identifies a specified face based on the results of comparison between registered face data previously obtained and said face data detected by said face data detection means.

8. The robot apparatus according to claim 7 wherein said person identification means identifies the specified face based on statistics of a plurality of results of comparison as obtained on a plurality of face data chronologically output by said face data detection means.

9. The robot apparatus according to claim 7 wherein said face identification means identifies the specified face based on a detected difference value obtained on taking the difference between the totality of registered face data previously obtained and said face data detected by said face data detection means.

10. The robot apparatus according to claim 9 wherein said face identification means identifying a specified person based on said detected difference value in said characteristic space.

11. The robot apparatus according to claim 7 further comprising:
storage means in which said registered face data is stored as database; and
image pickup mode image pickup means for storing a face image photographed in the image pickup mode in said database as registered face data.

12. The robot apparatus according to claim 1 having the appearance after the shape of an animal;
said image pickup means performing the role of an eye of said animal.

13. A method for discriminating a face comprising:
an image pickup step of photographing an image by image pickup means;
a face tracking step of tracking a face moved in an image photographed at said image pickup step;
a face data detection step of detecting face data of said face in the image photographed at said image pickup step based on the face tracking information obtained at said face tracking step;
a person identifying step of identifying a specified person based on said face data detected at said face data detection step; and
a learning step for using a difference between registered face data previously obtained and face data detected by said face data detection step to acquire a learned difference value to establish a characteristic space by said learned difference value.

14. The face discriminating method according to claim 13 wherein an autonomously acting robot apparatus owns said image pickup means.

15. An image discriminating apparatus comprising:
registered face image storage means having a face image stored therein;
image inputting means for being fed with a preset image from outside;
face picture tracking means for tracking a face image fed from said image inputting means based on the color information;
face detection means for detecting a face using a support vector machine for an estimated face position of said input face image calculated from tracked results by said face image tacking means;
person identification means for identifying a person by comparing a face detected by said face detection means with a face image stored in said registered face image storage means; and
learning means for using a difference between registered face data previously obtained and face data detected by said face data detection means to acquire a learned difference value to establish a characteristic space by said learned difference value.

16. An image discriminating method comprising:
an image inputting step of being fed with a preset image from outside;
a face image tracking step of tracking a face image fed at said image inputting step based on the color information;
a face detection step of detecting a face using a support vector machine for an estimated face position of said input face image calculated from the result of tracking at said face image tracking step; and
a person identifying step of identifying a person by comparing a face detected at said face detection step with a face image stored in said registered face image storage step in which the face image is stored; and
a learning step for using a difference between said registered face data and face data detected by said face data detection step to acquire a learned difference value to establish a characteristic space by said learned difference value.

* * * * *